Figure 1:
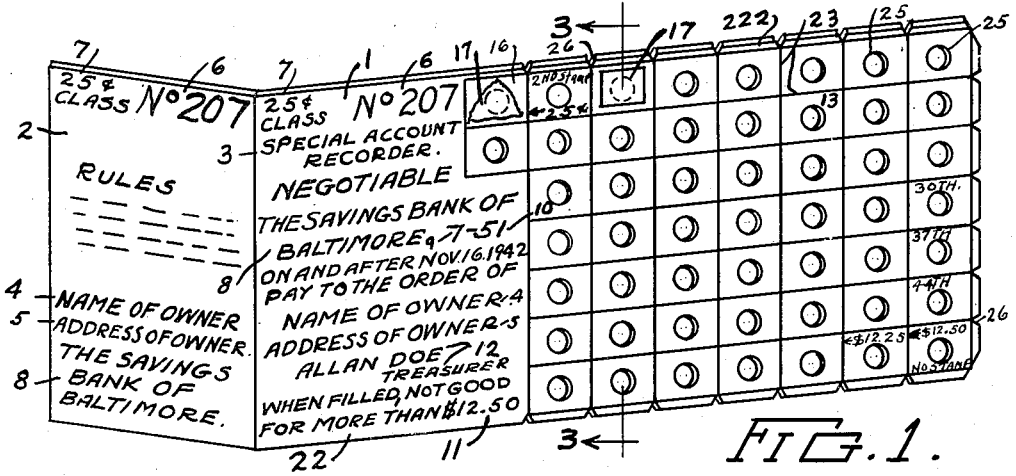

Sept. 14, 1943.     J. K. STEUART ET AL     2,329,227
SAVINGS CHECKER
Filed July 29, 1942

Inventor
JAMES K. STEUART.
ARTHUR W. MORGAN, JR.
By Howard J. Whelan.
Attorney

Patented Sept. 14, 1943

2,329,227

UNITED STATES PATENT OFFICE 2,329,227

SAVINGS CHECKER

James K. Steuart and Arthur W. Morgan, Jr., Baltimore, Md.

Application July 29, 1942, Serial No. 452,756

2 Claims. (Cl. 283—59)

This invention refers to mechanical or physical checkers, and more particularly to the type suitable for savings accounts and the like. It has amongst its objects to provide an arrangement for recording the value of accounts without employing written figures applied manually; to have the arrangement sustain itself automatically; to have it proof against fraudulent increases surreptitiously incorporated into the records. Another object is to provide in a single recorder or checker of this nature, the capacity of varying its value according to predetermined allotments of time and in such proportions as the arbitrary, monetary requirements of the accounts are based on. A further object is to eliminate the greater part of the visual amount of writing-posting and clerical work usually necessary to audit the account and provide the owner thereof with a written account of same; by providing a mechanical receipt in connection with the account that will automatically establish the value of same on a recorder or checker that will designate clearly and visually what the value is at a glance. A still further object is to give the recorder an amplified use capable of qualifying for an intrinsically valuable negotiable instrument; use as a check having a positive face value, rather than an arbitrary written one; and to have provision arranged for flexibly adjusting the value in a very definite, and physicological valuable manner; still another object is to incorporate the intangible ingredient of confidence in the value of the article to an extent not inculcated in other negotiable instruments. Also it is an object to provide a recorder that may be correctly readable and usable by those who are unable to read or are incapacitated optically. Also to have a type of practical negotiable instrument or article of the check nature, that will not require the use of a check protector marking, etc. Other objects will become apparent as the invention is more fully set forth.

There have been many inducements, to those handling the bank or fiduciary accounts of individuals and parties to reduce or eliminate the time, labor, cost, space and material required for handling accounts, especially in banks in their Christmas savings accounts and those of a similar nature. Coupon books and coupons have been used to some extent. This is a development, but still involves supplementary work, such as stamping the coupons when paid; collating same in numerical order; posting the ledger; making up special checks; addressing and mailing, with a net result that makes the expense, worry, effort, etc., reduce the financial values and practical results in handling the accounts, to a minimum. This invention eliminates a substantial proportion of the conventional operations used in handling accounts of this nature. For instance this collating and numerical arranging of details of the account is avoided, together with incidental efforts required for posting the ledger, addressing, mailing costs, and use of special checks and the work entailed in writing them up. Bookkeeping work is practically eliminated, personnel requirements are considerable less, materials and supplies are reduced to a minimum, and a more satisfactory system is provided, by the invention. The arrangement consists in the use of a checker, so-called, that forms the basis of a receipt and identification of account; stamps, markers or other mechanical articles are bought and applied properly to the checker and securely attached thereto, so as to give a visual and physical indication of the total value of the checker plus the value of the stamps thereon. The incidental details and characteristics of the stamps indicate the present and future value thereof, and enable the whole to be used as a negotiable instrument, available for very flexible commercial use Its scope of use is considerably increased by the fact, that it is available for use with persons having poor eyesight as there is a double indication for physical examination of the device by touch available, in addition to visual appreciation.

Figure 2:
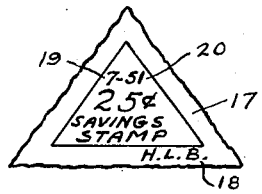
Figure 4:
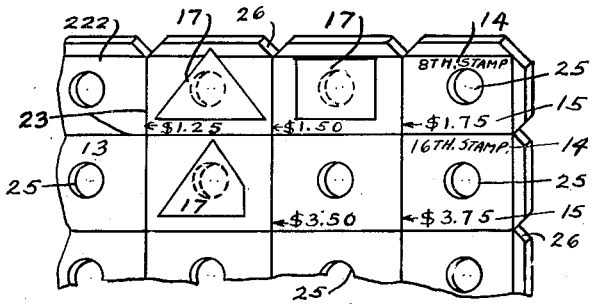
Figure 3:
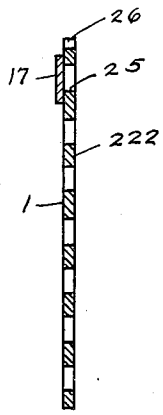

In the drawing, which shows a form of this invention:

Figure 1 is a view in perspective of a mechanical recorder embodying this invention, Figure 2 is a detail of the stamp or mechanical indicator marker used on the recorder shown in Figure 1, Figure 3 is a side elevation of Figure 1, taken along line 3—3 in section, and Figure 4 is a detail showing a portion of the recorder in detail and the effect of the use of stamps or indicator markers thereon.

Similar reference characters refer to similar parts throughout the drawing.

The drawing indicates the use of the invention for use with special savings accounts, as an example. In the drawing, 1 represents a so-called mechanical account checker. The recorder is divided preferably into 3 parts; the stub 2, with the serrations 3 provided for easy detachment, the identification portion 22, and the stamp and endorsement section 222. The checker and stub are each provided with lines 4 and 5 on which are placed the owner's name and address respectively. The serial number 6 is applied to the portion 22 and also stub 2 for identification purposes. The numeral 7 designates the class of account. In this instance it is for the use with a twenty-five cent (25 cent) denomination savings marker stamps. The checker has the name of the bank or organization 8 issuing same, together with any other connection such as the American Bankers Association (A. B. A.) transit numbers indicated at 9 and 10, for identification purposes that may be utilized. The checker also has marked or printed on its face, the total established monetary value 11, which can be acquired by said checker, when completely assembled with markers and filled-in according to regulations, inaugurated for its use. An officer's name or signature, authorized by the issuing bank or institution is subscribed to on a line 12. The face or front 21 of the checker is provided with a series of lines 23 marked into blocks 13 sufficient in number to correspond with the quantity of saving units determined on for that specific account. Each block has a printed designation 14 totaling the number and financial value of markers 17 already attached to the checker at any time selected. The financial or cash value with its corresponding arrow 15 shows the existing value of the savings checker up to and including the last marker placed thereon. The first or starting block is shown at 16, and is preferably followed in conventional alphabetical or other sequence to show continuity in marker placement throughout the recorder. The marker 17 may be initialed at 18 or finger printed, or otherwise sealed or mutilated by the purchaser to prevent their unauthorized use by others. Each marker has a transit or American Bankers Association or (A. B. A.) number 19 and 20 for additional identification purposes and such markers are intended to be placed on checkers bearing the same transit numbers as 9 and 10 if they are to be negotiated. The markers 17 are preferably of the form indicated to differentiate their construction from that of a conventional stamp. The checker is provided with small perforations 25, through the central portion of each block 13 and the lines 23 are notched at 26, along the edges of the checker to definitely establish their locations physically. The purpose of the perforation is to give visual or physical evidence of the use of a marker thereon, and also to enable an examination to be made of same by microscope, etc., if there is a question as to the marker being a fraudulent article or forgery. This would be difficult if the marker could be examined on one side only. In case of paper or the like, the perforations permit the examination of the marker with light on all sides and through it. The form of the marker may be varied to suit different periods of time and thus identify its value from an "interest" point of view, even if misplaced it also enables the checker to indicate the value from the back, by reason of the blanked perforations closing off the light therethrough. It has other advantages also. The markers after placement on the checker project sufficiently therefrom to form a physical difference that can be recognized by touch, and inform the observer as to the value of the checker at the moment. The materials of the articles described are preferably those that can be conveniently handled.

In the use of the device. The twenty-five (25) cent class savings account type of recorder is employed as an example. This procedure is preferably followed. The subscriber buys the checker for fifty (50) cents. His name and address is then placed on lines 4 and 5 on both the portion 22 and stub 2. A properly authorized officer connected with the issuing institution or party attaches signature or seal to line 12. One twenty-five (25) cent marker stamp 17 of suitable shape or form is attached to space 16, and the remaining twenty-five cents is credited by the issuing party as a token or handling charge in the event the savings checker is not completely assembled with markers or filled in within the prescribed time. After the marker 17 is placed and attached on block or space 16, the stub 2 and recorder portions 22 and 222 are detached from each other, the bank or issuing institution or party holds the stub and the owner of the account holds the savings portions 22 and 222. He attaches each twenty-five (25) cent marker to a block 13 as he purchases same. This augments the value of the checker at twenty-five (25) cents per marker, in proportion to the number of markers attached. The transit or American Bankers Association (A. B. A.) numbers on all markers 17 and checker 1, must coincide to make the checker negotiable at its maturity date and after endorsing on same according to the adopted rules. If the transit numbers on all of the markers do not coincide with the transit number on the savings checker, then the checker can only be cashed after maturity date at the bank or other place designated by the issuer.

While but one form of the invention is indicated in the drawing, it is not desired to limit this application for patent to this particular form, or in any other way, otherwise than limited by the scope of the application, as it is appreciated that other forms and constructions could be used that would employ the same principles and come within the scope of the appended claims.

Having thus described the invention what is claimed is:

1. A checker of the class described comprising a form having markings thereon dividing same into appropriately designed spaces, endorsement lines and identification data, said form being arranged to have monetary markers attached thereto and having holes therethrough covered thereby, said form having its edges punched out around the said spaces adjacent the peripheral border of same to visually emphasize their location and position on the form.

2. A checker of the class described comprising a rectangular form having line markings thereon dividing same into appropriately designated spaces, endorsement lines and identification data, said form being arranged to have monetary markers attached thereto within the spaces and having circular holes therethrough covered thereby, said form having several of its edges punched out around the said spaces adjacent the peripheral border of same to visually emphasize their location and position on the form, and a removal end piece for removing therefrom as a receipt therefor.

JAMES K. STEUART.
ARTHUR W. MORGAN, JR.